(12) United States Patent
Chi-Johnston et al.

(10) Patent No.: US 11,899,452 B2
(45) Date of Patent: Feb. 13, 2024

(54) AUTONOMOUS VEHICLE ROUTING BASED UPON RISK OF AUTONOMOUS VEHICLE TAKEOVER

(71) Applicant: GM Cruise Holdings LLC, San Francisco, CA (US)

(72) Inventors: Geoffrey Louis Chi-Johnston, San Francisco, CA (US); Vishal Suresh Vaingankar, Kensington, CA (US); Antony Joseph, San Francisco, CA (US); Sean Gregory Skwerer, San Francisco, CA (US); Lucio Otavio Marchioro Rech, San Mateo, CA (US); Nitin Kumar Passa, San Francisco, CA (US); Laura Athena Freeman, San Francisco, CA (US); George Herbert Hines, Kensington, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 56 days.

(21) Appl. No.: 17/463,175

(22) Filed: Aug. 31, 2021

(65) Prior Publication Data
US 2021/0397184 A1     Dec. 23, 2021

Related U.S. Application Data

(63) Continuation of application No. 16/280,599, filed on Feb. 20, 2019, now Pat. No. 11,112,794.

(51) Int. Cl.
G05D 1/00     (2006.01)
G05D 1/02     (2020.01)
(Continued)

(52) U.S. Cl.
CPC ........... *G05D 1/0061* (2013.01); *G01C 21/20* (2013.01); *G01C 21/3453* (2013.01); *G05D 1/0217* (2013.01); *G05D 2201/0213* (2013.01)

(58) Field of Classification Search
CPC .............. G05D 1/0061; G05D 1/0217; G05D 2201/0213; G01C 21/20; G01C 21/3453;
(Continued)

(56) References Cited

U.S. PATENT DOCUMENTS 8,606,512 B1   12/2013   Bogovich et al.
9,188,985 B1   11/2015   Hobbs et al.
(Continued)

OTHER PUBLICATIONS

"Non-Final Office Action for U.S. Appl. No. 16/280,599", dated Dec. 9, 2020, 11 Pages.
(Continued)

*Primary Examiner* — Michael V Kerrigan
(74) *Attorney, Agent, or Firm* — CALFEE, HALTER & GRISWOLD LLP

(57) ABSTRACT

Various technologies described herein pertain to routing an autonomous vehicle based upon risk of takeover of the autonomous vehicle by a human operator. A computing system receives an origin location and a destination location of the autonomous vehicle. The computing system identifies a route for the autonomous vehicle to follow from the origin location to the destination location based upon output of a computer-implemented model. The computer-implemented model is generated based upon labeled data indicative of instances in which autonomous vehicles are observed to transition from operating autonomously to operating based upon conduction by human operators while the autonomous vehicles are executing predefined maneuvers. The computer-implemented model takes, as input, an indication of a maneuver in the predefined maneuvers that is performed by the autonomous vehicle when the autonomous vehicle fol-
(Continued)

lows a candidate route. The autonomous vehicle then follows the route from the origin location to the destination location.

20 Claims, 13 Drawing Sheets

(51) Int. Cl.
*G01C 21/34* (2006.01)
*G01C 21/20* (2006.01)

(58) Field of Classification Search
CPC ........ G01C 21/3461; B60W 30/18145; B60W 30/18154; B60W 50/0097; B60W 60/0021; B60W 60/0053; B60W 60/0011
See application file for complete search history.

(56) References Cited

U.S. PATENT DOCUMENTS

| | | |
|---|---|---|
| 10,126,136 B2 | 11/2018 | Iagnemma |
| 10,156,848 B1 | 12/2018 | Konrardy et al. |
| 2017/0192437 A1 | 7/2017 | Bier et al. |
| 2017/0219364 A1 | 8/2017 | Lathrop et al. |
| 2017/0234689 A1 | 8/2017 | Gibson et al. |
| 2019/0120640 A1 | 4/2019 | Ho et al. |
| 2019/0146508 A1* | 5/2019 | Dean ................ G05D 1/0285 701/26 |
| 2020/0264605 A1 | 8/2020 | Chi-Johnston et al. |

OTHER PUBLICATIONS

"Reply to Non-Final Office Action for U.S. Appl. No. 16/280,599", Filed Dated: Mar. 9, 2021, 16 Pages.

"Ex Parte Quayle Action for U.S. Appl. No. 16/280,599", dated Jun. 7, 2021, 6 Pages.

"Reply to Ex Parte Quayle Action for U.S. Appl. No. 16/280,599", Filed Date: Jun. 9, 2021, 9 Pages.

"Notice of Allowance and Fees Due for U.S. Appl. No. 16/280,599", dated Jun. 24, 2021, 8 Pages.

* cited by examiner

AUTONOMOUS VEHICLE ROUTING BASED UPON RISK OF AUTONOMOUS VEHICLE TAKEOVER

CROSS-REFERENCE TO RELATED APPLICATION

This application is a continuation of U.S. patent application Ser. No. 16/280,599, filed on Feb. 20, 2019, and entitled "AUTONOMOUS VEHICLE ROUTING BASED UPON RISK OF AUTONOMOUS VEHICLE TAKEOVER", the entirety of which is incorporated herein by reference.

BACKGROUND

An autonomous vehicle is a motorized vehicle that can operate for extended distances and/or periods of time without a human operator (i.e., a driver) or without the human operator entirely. An exemplary autonomous vehicle includes a plurality of sensor systems, such as but not limited to, a lidar sensor system, a camera sensor system, and a radar sensor system, amongst others. The autonomous vehicle operates based upon sensor data output by the sensor systems.

In certain scenarios, a human operator may ride in an autonomous vehicle. Typically, the autonomous vehicle operates autonomously (i.e., without conduction by the human operator). However, in certain driving scenarios, it may be desirable to have the human operator take control of the autonomous vehicle and conduct operation of the autonomous vehicle as if it were a conventional vehicle. As such, the autonomous vehicle may be caused to transition from operating autonomously to operating based upon conduction by the human operator (referred to as "autonomous vehicle takeover") upon recognition that the autonomous vehicle is in a driving scenario in the certain driving scenarios. When the autonomous vehicle exits the driving scenario, the autonomous vehicle may be caused to transition back to operating autonomously.

Conventionally, autonomous vehicles tend to be routed from an origin location to a destination location based upon ad-hoc factors that minimize travel time and/or travel distance from the origin location to the destination location. Autonomous vehicles may also be routed based on operational factors such as distance to or distance from a charging station or a gas station. However, if such operational factors are the only ones considered, the resulting route might not be optimal from other perspectives, as other factors may also be important in generating a route for an autonomous vehicle to follow from the origin location to the destination location.

SUMMARY

The following is a brief summary of subject matter that is described in greater detail herein. This summary is not intended to be limiting as to the scope of the claims.

Described herein are various technologies that pertain to routing of an autonomous vehicle based upon risk of autonomous vehicle takeover by a human operator. More specifically, described herein is a computer-implemented model that is configured to output a score that is indicative of a likelihood of the autonomous vehicle transitioning from operating autonomously to operating based upon conduction by the human operator when the autonomous vehicle executes a maneuver in a list of predefined maneuvers along a candidate route from an origin location to a destination location. The autonomous vehicle (or a separate computing system) may identify a route for the autonomous vehicle to follow from the origin location to the destination location based in part upon the score. Further, the autonomous vehicle may follow the route from the origin location to the destination location.

In operation, a computing system receives an origin location of an autonomous vehicle and a destination location of the autonomous vehicle. In one embodiment, the computing system is comprised by the autonomous vehicle. In another embodiment, the computing system is separate from the autonomous vehicle (e.g., a server computing device).

The computing system identifies a route for the autonomous vehicle to follow from the origin location to the destination location based upon output of a computer-implemented model. The computing system identifies the route from amongst a plurality of candidate routes. The computing system (or another computing system) generates the computer-implemented model based upon labeled data. The labeled data is indicative of instances in which autonomous vehicles were observed to transition from operating autonomously to operating based upon conduction by human operators while the autonomous vehicles are executing predefined maneuvers. For instance, the predefined maneuvers may include remaining in a lane on a road, a left lane change, a right lane change, a left turn, an unprotected left turn, a right turn, an unprotected right turn, or remaining stationary. The computer-implemented model takes, as input, an indication of a maneuver in the predefined maneuvers that is performed by an autonomous vehicle when the autonomous vehicle follows a candidate route in the candidate routes from the origin location to the destination location. The computer-implemented model outputs a score that is indicative of a likelihood that the autonomous vehicle will be caused to transition from operating autonomously to operating based upon conduction by a human operator due to the autonomous vehicle executing the maneuver along the candidate route. The computing system identifies the route from amongst the candidate routes based in part upon the score. For instance, the computing system may generate a score for each maneuver along the route and the computing system may sum the score for each maneuver along the route. In an example, the computing system may select the route such that travel time to the destination location is balanced against risk of human operator takeover of the autonomous vehicle.

When the computing system is separate from the autonomous vehicle, the computing system transmits the route to the autonomous vehicle over a network. The autonomous vehicle controls a vehicle propulsion system of the autonomous vehicle, a braking system of the autonomous vehicle, and/or a steering system of the autonomous vehicle such that the autonomous vehicle follows the route from the origin location to the destination location.

The technologies set forth herein present various advantages over conventional computer-implemented routing approaches for autonomous vehicles. For example, an autonomous vehicle may employ the technologies described herein in order to balance a likelihood of autonomous vehicle takeover with other factors (e.g., travel time, travel distance, etc.). According to another example, even when a human operator is not present in the autonomous vehicle, the autonomous vehicle may utilize the technologies set forth herein in order to avoid potentially challenging driving scenarios.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
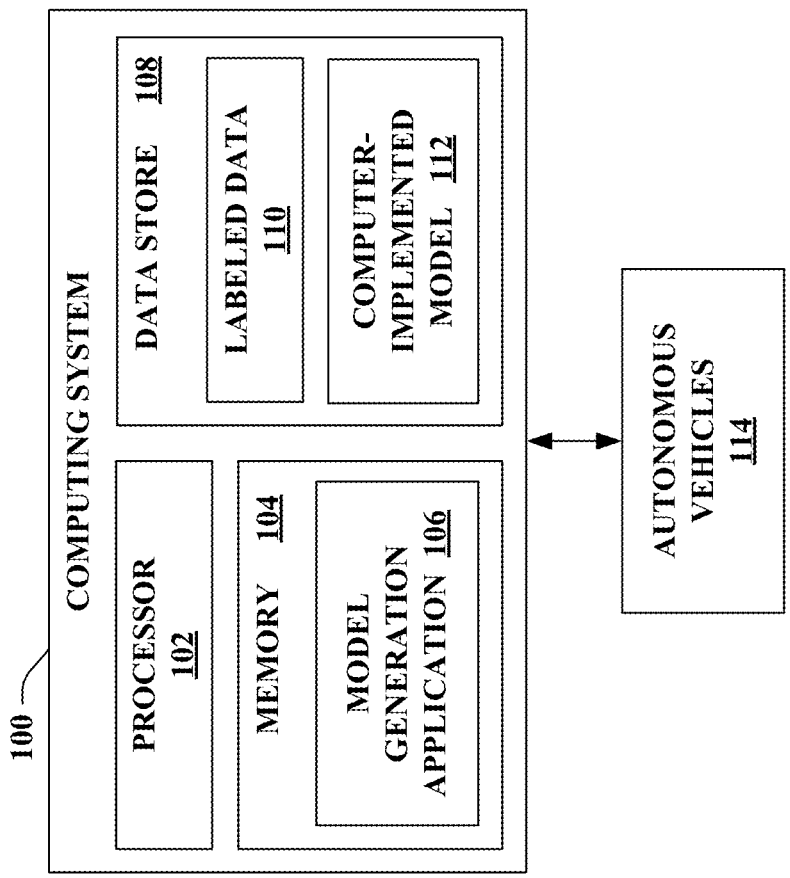
FIG. 1 illustrates a functional block diagram of an exemplary computing system that generates computer-implemented model(s).

Various technologies pertaining to routing an autonomous vehicle based upon risk of autonomous vehicle takeover by a human operator are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

With reference now to FIG. 1, an exemplary computing system 100 that generates computer-implemented model(s) is illustrated. The computing system 100 includes a processor 102 and memory 104, wherein the memory 104 has a model generation application 106 loaded therein. As will be described in greater detail below, the model generation application 106 (when executed by the processor 102) is configured to generate computer-implemented models (described below).

The computing system 100 also includes a data store 108. The data store 108 includes labeled data 110. The labeled data 110 is indicative of instances in which autonomous vehicles 114 were observed to transition from operating autonomously to operating based upon conduction by human operators (i.e., autonomous vehicle takeover) while the autonomous vehicles 114 executed a maneuver in a list of predefined maneuvers. For instance, the predefined maneuvers may include one or more of remaining in a lane on a road, a left lane change, a right lane change, a left turn, a right turn, or remaining stationary. The left turn and/or the right turn may be unprotected turns (i.e., an unprotected left turn and/or an unprotected right turn). Generally speaking, an unprotected turn is a turn in which an autonomous vehicle (or a conventional vehicle) must yield to traffic in one or more lanes of oncoming traffic.

In an embodiment, the autonomous vehicles 114 may automatically generate the labeled data 110. In another embodiment, the labeled data 110 may be manually labeled. According to an illustration, it is contemplated that the autonomous vehicles 114 can send data regarding the autonomous vehicles 114 transitioning from operating autonomously to operating based on human operators to the computing system 100 (e.g., via a network, via other computing system(s)) and the corresponding maneuvers being executed by the autonomous vehicles 114 when such transitions occur. The data can specify times, locations, maneuvers, and so forth corresponding to the transitions (operating autonomously to operating based on human operators). Moreover, the labeled data 110 can be, include, or be generated based on the data obtained from the autonomous vehicles 114. However, the claimed subject matter is not limited to the autonomous vehicles transmitting such data, as the data can be provided to the computing system 100 in substantially any other manner.

Below are various examples of differing types of maneuvers that can be performed by an autonomous vehicle.

In an example, an autonomous vehicle executes an unprotected (left) turn when the autonomous vehicle is stopped at a red traffic light at an intersection on a one-way road in a leftmost lane of the one-way road and the autonomous vehicle makes a left turn onto another one-way road. If, however, the autonomous vehicle has a green traffic light, the (left) turn is protected.

In another example, an autonomous vehicle executes an unprotected (left) turn when the autonomous vehicle executes a left turn at an intersection and the intersection does not have a left-turn green arrow. If the intersection has a left-turn green arrow, the (left) turn is protected.

In a further example, an autonomous vehicle executes an unprotected (right) turn when the autonomous vehicle is stopped at a red traffic light on a one-way road in a rightmost lane of the one-way road and the autonomous vehicle makes a right onto another one-way road. If, however, the autonomous vehicle has a green traffic light, the (right) turn is protected. Additionally, if the autonomous vehicle is not in the rightmost lane of the road, the (right) turn is protected.

In a yet another example, when an autonomous vehicle executes a turn at a yield sign, the turn is unprotected.

In another example, an autonomous vehicle is at a minor-major intersection. A minor-major intersection is 1) an intersection in which the autonomous vehicle has a stop sign, but the cross-street does not, 2) an intersection in which the autonomous vehicle is merging on a bottom leg of a T-intersection, or 3) an intersection in which the autonomous vehicle is merging from a narrow street (e.g., a street that is 6 m wide) onto a larger street (e.g., a street having marked lanes or multiple lanes in each direction). Turns at minor-major intersections are unprotected.

In a further example, an autonomous vehicle is not at a minor-major intersection. If there is no control device (e.g., a traffic light, a stop sign, a yield sign, etc.) at the intersection and there is not an obvious right of way, the turn is unprotected. Otherwise, the turn is protected.

The data store 108 also includes a computer-implemented model 112 generated by the model generation application 106. The computer-implemented model 112 may be generated by way of a computer-implemented machine learning algorithm. In general, the computer-implemented model 112 is configured to take, as input, an indication of a maneuver (in the list of predefined maneuvers) that is to be performed by an autonomous vehicle when the autonomous vehicle follows a route from an origin location to a destination location. The computer-implemented model 112 is further configured to output a likelihood that an autonomous vehicle will be caused to transition from operating autonomously to operating based upon conduction by a human operator based upon the indication of the maneuver executed by the autonomous vehicle along the route. Although not depicted in FIG. 1, the computer-implemented model 112 may also be retained in the memory 104.

In an embodiment, the computer-implemented model 112 may be or include a mixed effects model. In another embodiment, the computer-implemented model 112 may be or include a Bayesian hierarchical model, a random forest model, or a neural network. When the computer-implemented model 112 includes a neural network, the neural network may be or include an artificial neural network (ANN) model, a deep neural network (DNN) model, a convolutional neural network (CNN) model, a recurrent neural network (RNN) model, or another suitable neural network model.

In an example, the computer-implemented model 112 may comprise nodes and edges that couple nodes in the computer-implemented model 112. Each edge is assigned a learned weight, wherein the learned weight can be learned using a supervised or semi-supervised learning procedure. Accordingly, for instance, a learned weight assigned to an edge can be influenced by a portion of the labeled data 110. The computer-implemented model 112 may take, as input, an indication of a maneuver (in a list of predefined maneuvers) that is performed by an autonomous vehicle when the autonomous vehicle follows a route from an origin location to a destination location. The computer-implemented model 112 may output a score that is indicative of a likelihood that the autonomous vehicle will be caused to transition from operating autonomously to operating based upon conduction by a human operator due to the autonomous vehicle executing the maneuver along the route, wherein the score is based upon the weights assigned to the edges and the indication of the maneuver.

It is understood that an influence of a maneuver on a likelihood of autonomous vehicle takeover by a human operator may change depending on a type of control device (e.g., a traffic light, a stop sign, a yield sign, etc.) that controls traffic at an intersection (along a route) at the time of the maneuver. Thus, in an embodiment, the score output by the computer-implemented model 112 may be based upon the type of traffic control device at the intersection.

It is understood that an influence of a maneuver on a likelihood of autonomous vehicle takeover may change depending on a time of day that the maneuver is executed, in a general sense or a maneuver-specific sense. In the general sense, the time of day may enter the computer-implemented model 112 as a separate predictive factor that is independent from any specific maneuver (e.g., an average predicted likelihood of autonomous vehicle takeover may vary independently of maneuver, by morning, afternoon, and evening). In the maneuver-specific sense, the time of day of a maneuver may affect maneuvers differently (e.g., an unprotected left turn executed during the morning and an unprotected left turn executed during the afternoon may have differing impacts on likelihood of autonomous vehicle takeover). Thus, in an embodiment, the score output by the computer-implemented model 112 may additionally be based upon a time of day (in the general sense or the maneuver-specific sense, described above).

In an embodiment, the computer-implemented model 112 may additionally take an indication of a weather condition (e.g., rainy, sunny, snowy, etc.) as input. The score output by the computer-implemented model 112 may be further based upon the weather condition, either in a general sense similar to that described above, or in a maneuver-specific sense similar to that described above.

Operation of the computing system 100 is now set forth. The computing system 100 receives the labeled data 110. For instance, the computing system 100 may receive the labeled data 110 from the autonomous vehicles 114. The model generation application 106 accesses the labeled data 110 from the data store 108. The model generation application 106 then generates the computer-implemented model 112 based upon the labeled data 110. Subsequent to generating the computer-implemented model, the model generation application 106 may update the computer-implemented model 112 when additional labeled data is received by the computing system 100. Although the model generation application 106 has been described as generating a single computer-implemented model (namely, the computer-implemented model 112), it is to be understood that the model generation application 106 may generate many different computer-implemented models.

Figure 2:
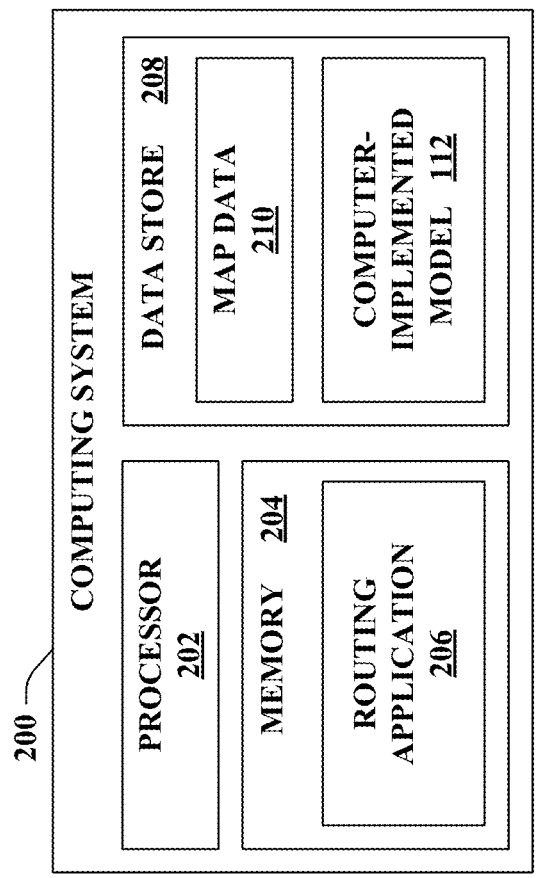
FIG. 2 illustrates a functional block diagram of an exemplary computing system that identifies a route for an autonomous vehicle.

Referring now to FIG. 2, an exemplary computing system 200 that identifies a route for an autonomous vehicle is illustrated. In an embodiment, the computing system 200 may be or include the computing system 100 or the computing system 100 may be or include the computing system 200. The computing system 200 may be referred to as a server computing device. The computing system 200 includes a processor 202 and memory 204, wherein the memory 204 has a routing application 206 loaded therein. As will be described in greater detail below, the routing application 206 (when executed by the processor 202) is generally configured to identify a route for an autonomous vehicle to follow from an origin location to a destination location. The routing application 206 may be configured to identify a route that minimizes risk of autonomous vehicle takeover. The routing application 206 may also be configured to identify a route that balances travel time or travel distance of the autonomous vehicle along the route with risk of autonomous vehicle takeover.

The computing system 200 may also include a data store 208. The data store 208 may include map data 210. In general, the map data 210 comprises maps of driving environments of autonomous vehicles. The routing application 206 may identify candidate routes for an autonomous vehicle to follow from an origin location to a destination location based upon the map data 210. The data store 208 may also include the computer-implemented model 112 described above.

Figure 3:
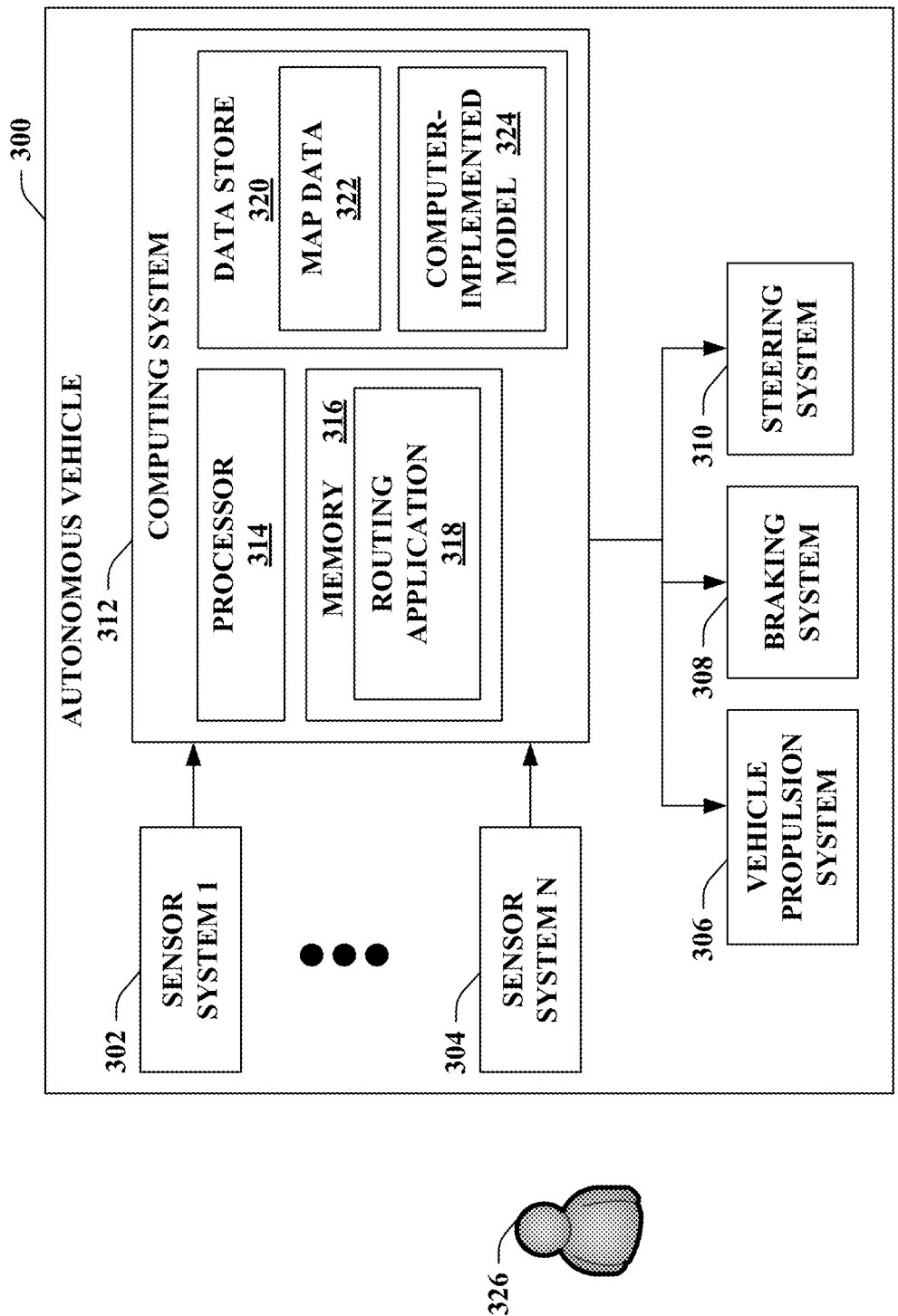
FIG. 3 illustrates a functional block diagram of an exemplary autonomous vehicle.

Turning now to FIG. 3, an exemplary autonomous vehicle 300 is illustrated. The autonomous vehicle 300 can navigate about roadways without human conduction based upon sensor data (i.e., sensor signals) outputted by sensor systems of the autonomous vehicle 300. The autonomous vehicle 300 includes sensor systems, namely, a sensor system 1 302, . . . , and a sensor system N 304, where N can be substantially any integer greater than 1 (collectively referred to herein as sensor systems 302-304). The sensor systems 302-304 are of different types and are arranged about the autonomous vehicle 300. For example, the sensor system 1 302 may be a lidar sensor system and the sensor system N 304 may be a camera sensor (image) system. Other exemplary sensor systems included in the sensor systems 302-304 can include radar sensor systems, satellite-based radio navigation sensor systems (e.g., global positioning system (GPS) sensor systems), sonar sensor systems, infrared sensor systems, and the like. The sensor systems 302-304 generate (i.e., output) sensor data. For instance, the radar sensor systems can generate radar sensor data, the lidar sensor systems can generate lidar sensor data, the camera sensor systems can generate camera sensor data, etc.

The autonomous vehicle 300 further includes several mechanical systems that are used to effectuate appropriate motion of the autonomous vehicle 300. For instance, the mechanical systems can include, but are not limited to, a vehicle propulsion system 306, a braking system 308, and a steering system 310 (collectively, "the mechanical systems 306-310"). The vehicle propulsion system 306 may be an electric motor, an internal combustion engine, or a combination thereof. The braking system 308 can include an engine brake, brake pads, actuators, and/or any other suitable componentry that is configured to assist in decelerating the autonomous vehicle 300. The steering system 310 includes suitable componentry that is configured to control the direction of movement of the autonomous vehicle 300.

The autonomous vehicle 300 further comprises a computing system 312. The computing system 312 comprises a processor 314 and memory 316. The memory 316 may have a routing application 318 loaded therein. As will be described in greater detail below, the routing application 318 (when executed by the processor 314) is generally configured to identify a route for the autonomous vehicle 300 to follow from an origin location to a destination location. The routing application 318 can be substantially similar to the routing application 206 (e.g., the routing application 318 is executed by the processor 314 of the autonomous vehicle 300 and the routing application 206 is executed by the processor 202 of the computing system 200).

The computing system 312 may also include a data store 320. The data store may include map data 322 similar or identical to the map data 210 described above in the description of FIG. 2. The data store 320 may also include a computer-implemented model 324. The computer-implemented model 324 may be or include the computer-implemented model 112 described above and the computer-implemented model 112 may be or include the computer-implemented model 324.

In an embodiment, a human operator 326 may ride in the autonomous vehicle 300. It is contemplated that the autonomous vehicle 300 typically operates autonomously. However, in certain driving scenarios, the autonomous vehicle 300 may be caused to transition from operating autonomously to operating based upon conduction by the human operator 326. The autonomous vehicle 300 may also be caused to transition from operating based upon conduction by the human operator 326 to operating autonomously upon exit of the autonomous vehicle 300 from the certain driving scenarios.

In an embodiment, the autonomous vehicle 300 may also include various components (not shown) that enable the autonomous vehicle 300 to be (optionally) operated by the human operator 326. For instance, the components may include a driver seat, a steering wheel, a brake pedal, an acceleration pedal, a gear selector, mirrors, a speedometer, an accelerometer, etc.

Figure 4:
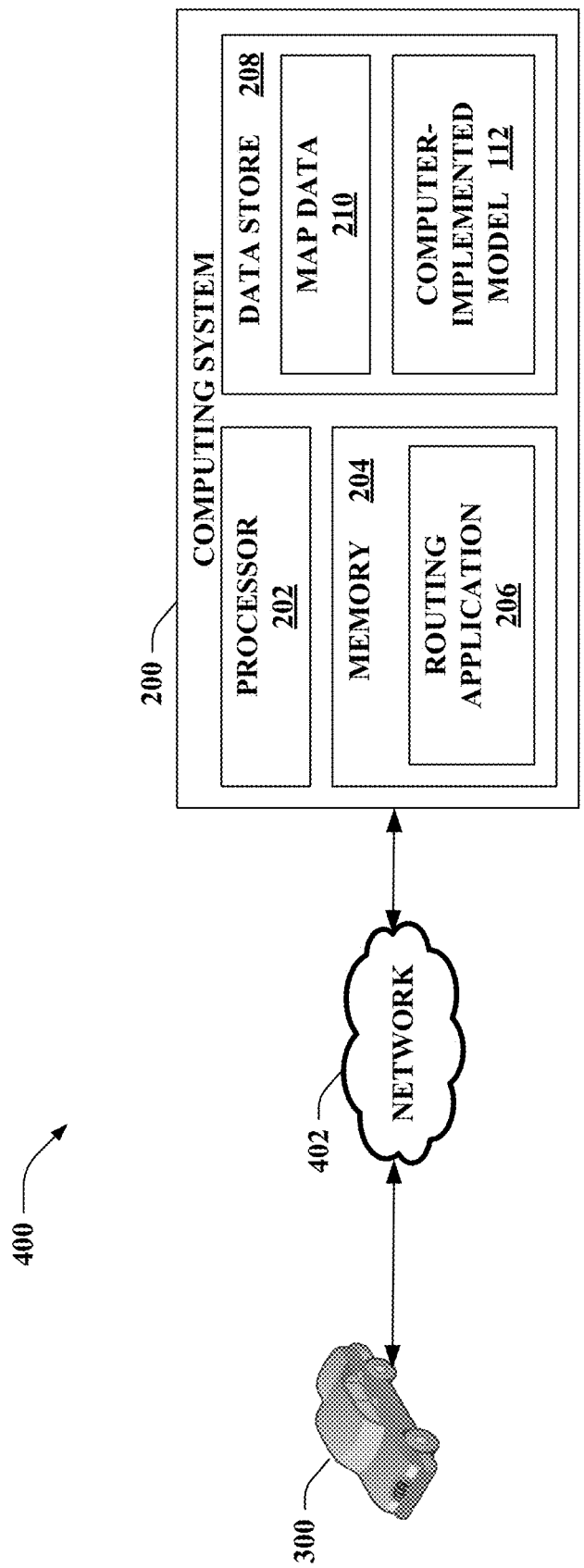
FIG. 4 illustrates a functional block diagram of an exemplary computing environment.

With reference now to FIG. 4, an exemplary computing environment 400 is illustrated. The computing environment 400 includes the computing system 200 and the autonomous vehicle 300 described above. The computing system 200 and the autonomous vehicle 300 may be in communication by way of a network 402 (e.g., the Internet). The computing system 200 and the autonomous vehicle 300 may also be in communication by way of several different networks (not shown). In addition to the autonomous vehicle 300, it is also contemplated that the computing system 200 is in communication with many different autonomous vehicles (not shown).

With reference generally now to FIGS. 1-4, operation of the computing environment 400 is now set forth. In a first embodiment, the computing system 200 receives an origin location of the autonomous vehicle 300 and a destination location of the autonomous vehicle 300. For instance, the computing system 200 may receive the origin location and the destination location from a computing device (e.g., mobile computing device) operated by a passenger (or future passenger) of the autonomous vehicle 300. In an example, the origin location and/or the destination location may be GPS coordinates. In another example, the origin location and/or the destination location may be street addresses.

In the first embodiment, responsive to receiving the origin location and the destination location, the routing application 206 of the computing system 200 generates candidate routes from the origin location to the destination location based upon the map data 210. The routing application 206 may generate a weighted directed graph based upon the candidate routes. The weighted directed graph comprises nodes and directed edges that couple at least some of the nodes. The nodes may represent intersections that are traversed by the autonomous vehicle 300 when the autonomous vehicle 300 traverses the candidate routes. The directed edges may represent roads that connect at least some of the intersections along the candidate routes. The routing application 206 may assign weights to the directed edges. The weights may be indicative of costs to the autonomous vehicle 300 for traversing the intersections. For instance, a weight assigned to a directed edge in the directed edges may be a time cost to the autonomous vehicle 300 or a distance cost to the autonomous vehicle 300 for traversing an intersection in the intersections.

In the first embodiment, the routing application 206 may input an indication of a maneuver (in the predefined list of maneuvers described above) that is to be executed by the autonomous vehicle 300 when the autonomous vehicle 300 traverses a candidate route in the candidate routes to the computer-implemented model 112. In a non-limiting example, the maneuver may be an unprotected left turn that the autonomous vehicle executes when traversing the candidate route. The computer-implemented model 112 outputs a score based upon the indication of the maneuver. The score is indicative of a likelihood that the autonomous vehicle 300 will be caused to transition from operating autonomously to operating based upon conduction by the human operator 326 due to the autonomous vehicle 300 executing the maneuver along the candidate route. The routing application 206 may repeat this process for maneuvers performed along each of the candidate routes in order to generate a score for each maneuver performed on each candidate route.

In the first embodiment, the routing application 206 then updates at least one weight of at least one directed edge in the weighted directed graph based upon the score for the maneuver. The routing application 206 may repeat this process for each score generated by the computer-implemented model 112. In an example, the routing application 206 may increase a weight of an edge that connects to a node that represents an intersection that is associated with autonomous vehicle takeover. In another example, the routing application 206 may decrease a weight of an edge that connects to a node that represents an intersection that is not associated with autonomous vehicle takeover. Thus, the weights of the directed edges in the weighted directed graph are now further based upon the likelihood that the autonomous vehicle 300 will transition from operating autonomously to operating based upon conduction by the human operator 326 due to the autonomous vehicle 300 executing maneuvers along the candidate routes.

In the first embodiment, the routing application 206 then identifies a route that the autonomous vehicle 300 is to follow from the origin location to the destination location by applying a shortest path algorithm to the weighted directed graph. For instance, the shortest path algorithm may be one of a Dijkstra's algorithm, a Bellman-Ford algorithm, or a Floyd-Warshall algorithm.

In the first embodiment, the routing application 206 transmits the route to the autonomous vehicle 300. The computing system 312 of the autonomous vehicle 300 controls at least one of the vehicle propulsion system 306, the braking system 308, or the steering system 310 such that the autonomous vehicle 300 follows the route from the origin location to the destination location. Additionally, the autonomous vehicle 300 may additionally utilize sensor data generated by the sensor systems 302-304 in order to follow the route from the origin location to the destination location.

In a second embodiment, the autonomous vehicle 300 determines an origin location of the autonomous vehicle 300 and a destination location of the autonomous vehicle 300. For instance, the autonomous vehicle 300 may determine the origin location based upon sensor data generated by the sensor systems 302-304 and/or the map data 322. The autonomous vehicle 300 may receive the destination location from the computing system 200 or from a computing device operated by a passenger (or future passenger) of the autonomous vehicle 300.

In the second embodiment, responsive to receiving the origin location and the destination location, the routing application 318 of the computing system 312 of the autonomous vehicle 300 generates candidate routes from the origin location to the destination location based upon the map data 322 (similar to the process described in the first embodiment). The routing application 318 may generate a weighted directed graph based upon the candidate routes (similar to the process described in the first embodiment).

In the second embodiment, the routing application 318 inputs an indication of a maneuver (in the predefined list of maneuvers described above) that is to be executed by the autonomous vehicle 300 when the autonomous vehicle 300 traverses a candidate route in the candidate routes to the computer-implemented model 324. The computer-implemented model 324 outputs a score based upon the indication of the maneuver. The score is indicative of a likelihood that the autonomous vehicle 300 will be caused to transition from operating autonomously to operating based upon conduction by the human operator 326 due to the autonomous vehicle 300 executing the maneuver along the candidate route. The routing application 318 may repeat this process for every maneuver performed along each of the candidate routes in order to generate a score for each maneuver performed on each candidate route.

In the second embodiment, the routing application 318 then updates at least one weight of at least one directed edge in the weighted directed graph based upon the score for the maneuver. The routing application 318 may repeat this process for each score generated by the computer-implemented model 324 (similar to the process described in the first embodiment). Thus, the weights of the directed edges in the weighted directed graph are now further based upon the likelihood that the autonomous vehicle 300 will transition from operating autonomously to operating based upon conduction by the human operator 326 due to the autonomous vehicle 300 executing maneuvers along the candidate routes.

In the second embodiment, the routing application 318 then identifies a route that the autonomous vehicle 300 is to follow from the origin location to the destination location by applying a shortest path algorithm to the weighted directed graph (similar to the process described in the first embodiment).

In the second embodiment, the computing system 312 of the autonomous vehicle 300 then controls at least one of the vehicle propulsion system 306, the braking system 308, or the steering system 310 such that the autonomous vehicle 300 follows the route from the origin location to the destination location. Additionally, the autonomous vehicle 300 may additionally utilize sensor data generated by the sensor systems 302-304 in order to follow the route from the origin location to the destination location.

Although the first embodiment and the second embodiment described above have been described as being primarily performed by the computing system 200 and the computing system 312 of the autonomous vehicle 300, respectively, other possibilities are contemplated. For instance, in another embodiment, the autonomous vehicle 300 may generate the weighted directed graph and query the computing system 200 for the scores (described above). The autonomous vehicle 300 may then update the weights of the weighted directed graph based upon the scores received from the computing system 200.

In an embodiment, the routing application 206 and/or the routing application 318 may overlay the scores output by the computer-implemented model 112 and/or the computer-implemented model 324, respectively, with the map data 210 and/or the map data 322 in order to generate a heat map. The heat map may include indications of intersections along the candidate routes at which autonomous vehicle takeover is likely as well as indications of intersections along the candidate routes at which autonomous vehicle takeover is unlikely.

In an embodiment, the routing application 206 and/or the routing application 318 may utilize the scores (described above) in order to optimize a loss function (i.e., an objective function). The loss function may be a linear or nonlinear function. The routing application 206 and/or the routing application 318 may utilize the loss function in order to identify the route.

In an embodiment, the routing application 206 and/or the routing application 318 may specify a loss function that incorporates a business objective into the set of constraints. For example, the routing application 206 and/or the routing application 318 may utilize the loss function to identify a route that minimizes a likelihood of autonomous vehicle takeover while increasing the travel time from the origin location to the destination location by no more than 5 minutes.

In an embodiment, the routing application 206 and/or the routing application 318 may specify a loss function that directly incorporates a business objective (i.e., a business priority). For example, the routing application 206 and/or the routing application 318 may utilize the loss function to identify a route that minimizes a weighted sum of a likelihood of autonomous vehicle takeover in addition to the estimated time to arrival to the destination location. The business objective may be incorporated into a set of constraints utilized by the routing application 206 and/or the routing application 318.

In an embodiment, the routing application 206 and/or the routing application 318 may be configured to identify a route that maximizes a likelihood that the autonomous vehicle 300 will be caused to transition from operating autonomously to operating based upon conduction by the human operator 326. This embodiment may be advantageous in scenarios in which testing of autonomous vehicles is desirable. The routing application 206 and/or the routing application 318 may invert weights assigned to the weighted directed graph in order to identify the route that maximizes a likelihood that the autonomous vehicle 300 will be caused to transition from operating autonomously to operating based upon conduction by the human operator 326.

In an embodiment, the routing application 206 and/or the routing application 318 may generate parametric tradeoff curves for each of the candidate routes based upon the scores and costs assigned to the candidate routes. The routing application 206 and/or the routing application 318 may generate the parametric tradeoff curves based upon one or more business objectives as well.

Figure 5:
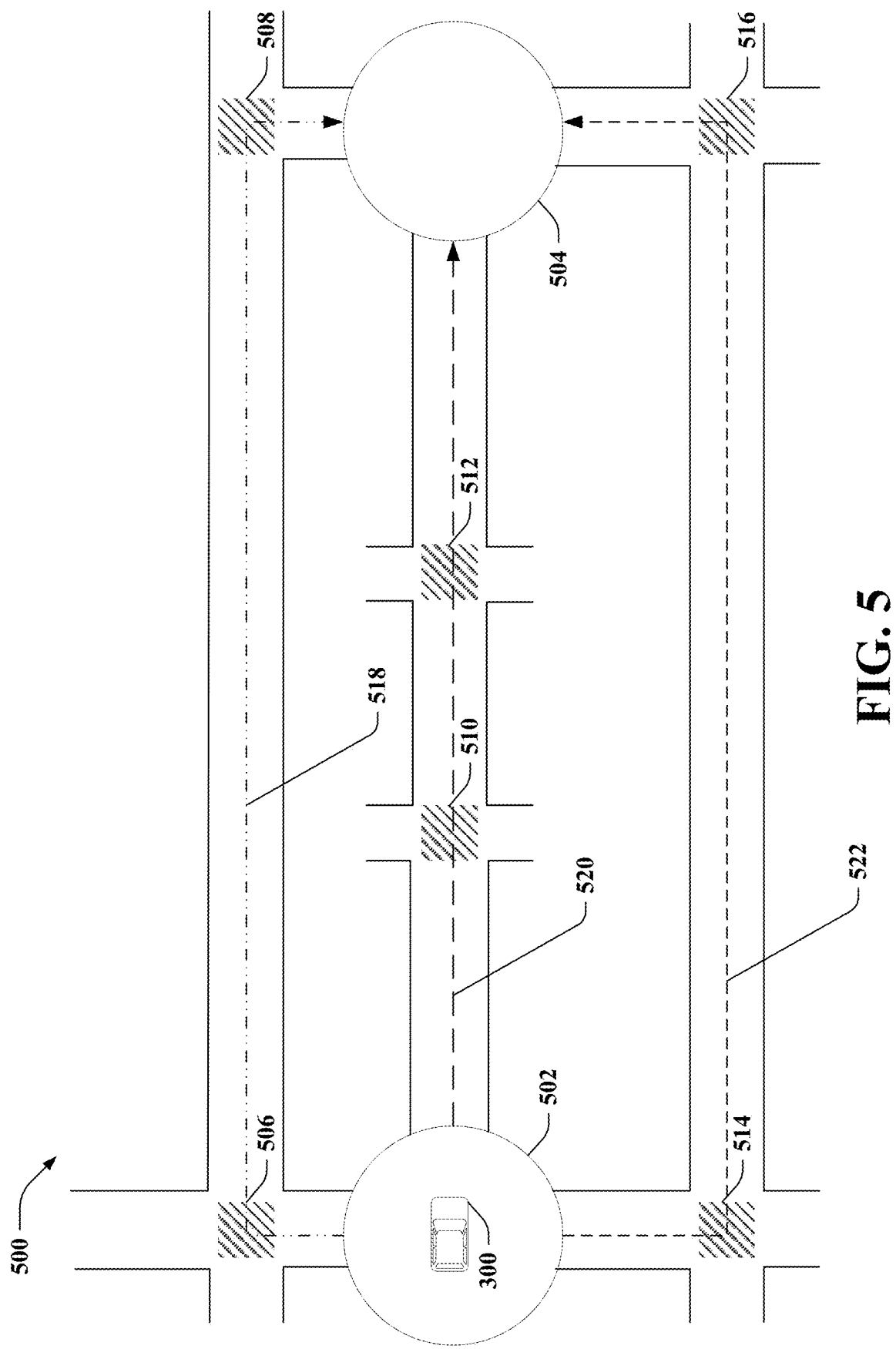
FIG. 5 illustrates an exemplary driving environment of an autonomous vehicle.

FIGS. 5-9 illustrate a specific example of operation of the systems and methods described above. Referring now to FIG. 5, an exemplary driving environment 500 is illustrated. The driving environment 500 includes the autonomous vehicle 300 described above. It is contemplated that the autonomous vehicle 300 is initially located at an origin location 502 in the driving environment 500. Furthermore, it is contemplated that the autonomous vehicle 300 is to traverse the driving environment 500 such that the autonomous vehicle 300 arrives at the destination location 504.

The driving environment 500 includes a first candidate route 518 from the origin location 502 to the destination location 504, a second candidate route 520 from the origin location 502 to the destination location 504, and a third candidate route 522 from the origin location 502 to the destination location 504 (collectively, "the candidate routes 518-522"). The first candidate route 518 includes a first intersection 506 and a second intersection 508 that are traversed by the autonomous vehicle 300 when the autonomous vehicle 300 follows the first candidate route 518. The second candidate route 520 includes a third intersection 510 and a fourth intersection 512 that are traversed by the autonomous vehicle 300 when the autonomous vehicle 300 follows the second candidate route 520. The third candidate route 522 includes a fifth intersection 514 and a sixth intersection 516 that are traversed by the autonomous vehicle 300 when the autonomous vehicle 300 follows the third candidate route 522. As shown in FIG. 5, the candidate routes 518-522 may vary in length. For instance, the first candidate route 518 may be a longer distance from the origin location 502 to the destination location 504 than the second candidate route 522.

Figure 6:
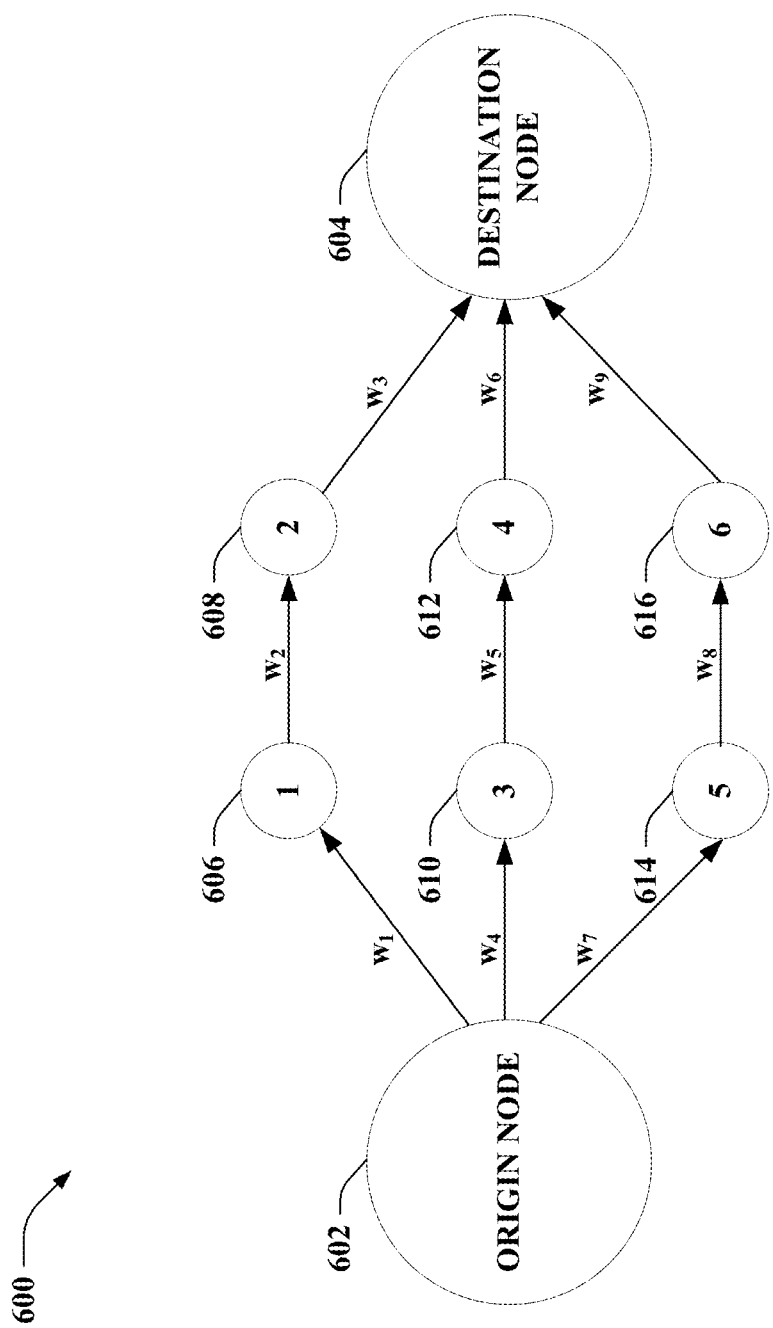
FIG. 6 illustrates an exemplary weighted directed graph corresponding to the driving environment of FIG. 5.

Turning now to FIG. 6, an exemplary weighted directed graph 600 is illustrated. The routing application 206 of the computing system 200 and/or the routing application 318 of the autonomous vehicle 300 may generate the weighted directed graph 600 based upon the map data 210 and/or the map data 322, respectively. The weighted directed graph 600 is based upon the driving environment 500 described above in the description of FIG. 5.

As such, the weighted directed graph 600 includes an origin node 602 that represents the origin location 502 of the autonomous vehicle 300 and a destination node 604 that represents the destination location 504 of the autonomous vehicle 300. The weighted directed graph 600 additionally includes a first node 606, a second node 608, a third node 610, a fourth node 612, a fifth node 614, and a sixth node 616 (collectively, "the nodes 606-616"). Each node in the nodes 606-616 represents an intersection in the intersections 506-516. For instance, the first node 606 represents the first intersection 506, the second node 608 represents the second intersection 508, and so forth.

The weighted directed graph 600 further includes directed edges (indicated by arrows in FIG. 6) that couple at least some of the origin node 602, the destination node 604, and the nodes 606-616. Each directed edge in the directed edges represents a path (i.e., a road) that connects an intersection in the driving environment 500 to another intersection in the driving environment 500, the origin location 502 to an intersection in the driving environment 500, or an intersection in the driving environment 500 to the destination location 504. Each directed edge is assigned a weight (weights $w_1$ to $w_9$), wherein the weight is indicative of the cost (e.g., a time cost, a distance cost, etc.) to the autonomous vehicle 300 in selecting a route that passes through an intersection in the intersections 506-516 of the driving environment. For instance, the weights $w_1$ and $w_2$ are indicative of a cost to the autonomous vehicle 300 in selecting the first candidate route 518 for the autonomous vehicle 300 to traverse from the origin location 502 to the destination location 504. The cost can be a travel time cost, a travel distance cost, a combination thereof, or the like.

Figure 7:
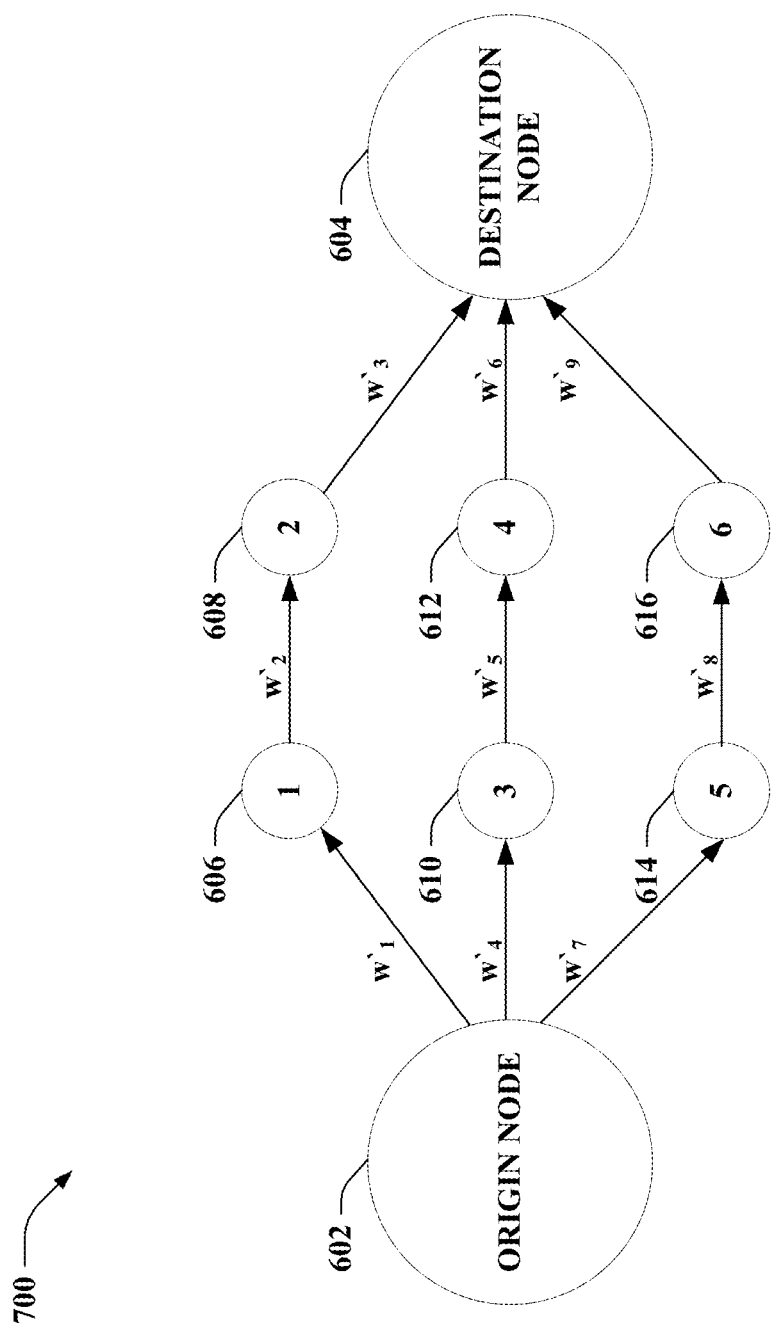
FIG. 7 illustrates another exemplary weighted directed graph corresponding to the driving environment of FIG. 5.

With reference now to FIG. 7, another exemplary weighted directed graph 700 is illustrated. The routing application 206 of the computing system 200 and/or the routing application 318 of the autonomous vehicle 300 may generate the weighted directed graph 700. The weighted directed graph 700 includes the origin node 602, the destination node 604, the nodes 606-616, and the directed edges as described above in the description of FIG. 6. However, as shown in FIG. 7, the routing application 206 and/or the routing application 318 has modified the weights $w_1$ to $w_9$ (from the weighted directed graph 600 of FIG. 6) to generate modified weights $w'_1$ to $w'_9$, respectively, thereby generating the weighted directed graph 700. Each of the modified weights $w'_1$ to $w'_9$ are based upon one or more scores (described above) output by the computer-implemented model 112 and/or the computer-implemented model 324. For instance, the weight $w'_1$ may be based upon both a travel time (or a travel distance) cost assigned to the first intersection 506 as well as a likelihood that the autonomous vehicle 300 will be caused to transition from operating autonomously to operating based upon conduction by the human operator 326 due to the autonomous vehicle 300 executing a maneuver in the list of predefined maneuvers at the first intersection 506 and/or the second intersection 508.

According to an example, the autonomous vehicle 300 may perform an unprotected left turn at the intersection 514 if traveling along the route 522. Following this example, the weight $w'_7$ of the edge between the origin node 602 and node 5 614 (which represents the intersection 514) may be modified to account for the corresponding likelihood of human operator takeover of the autonomous vehicle 300 due to performance of the unprotected left turn at the intersection 514. The weight $w'_7$ of the edge may be increased relative to the weight $w_7$ of such edge from FIG. 6, which can lead to the route 522 traversing through the intersection 514 being less likely selected for the autonomous vehicle 300 traveling from the origin location 502 to the destination location 504.

Figure 8:
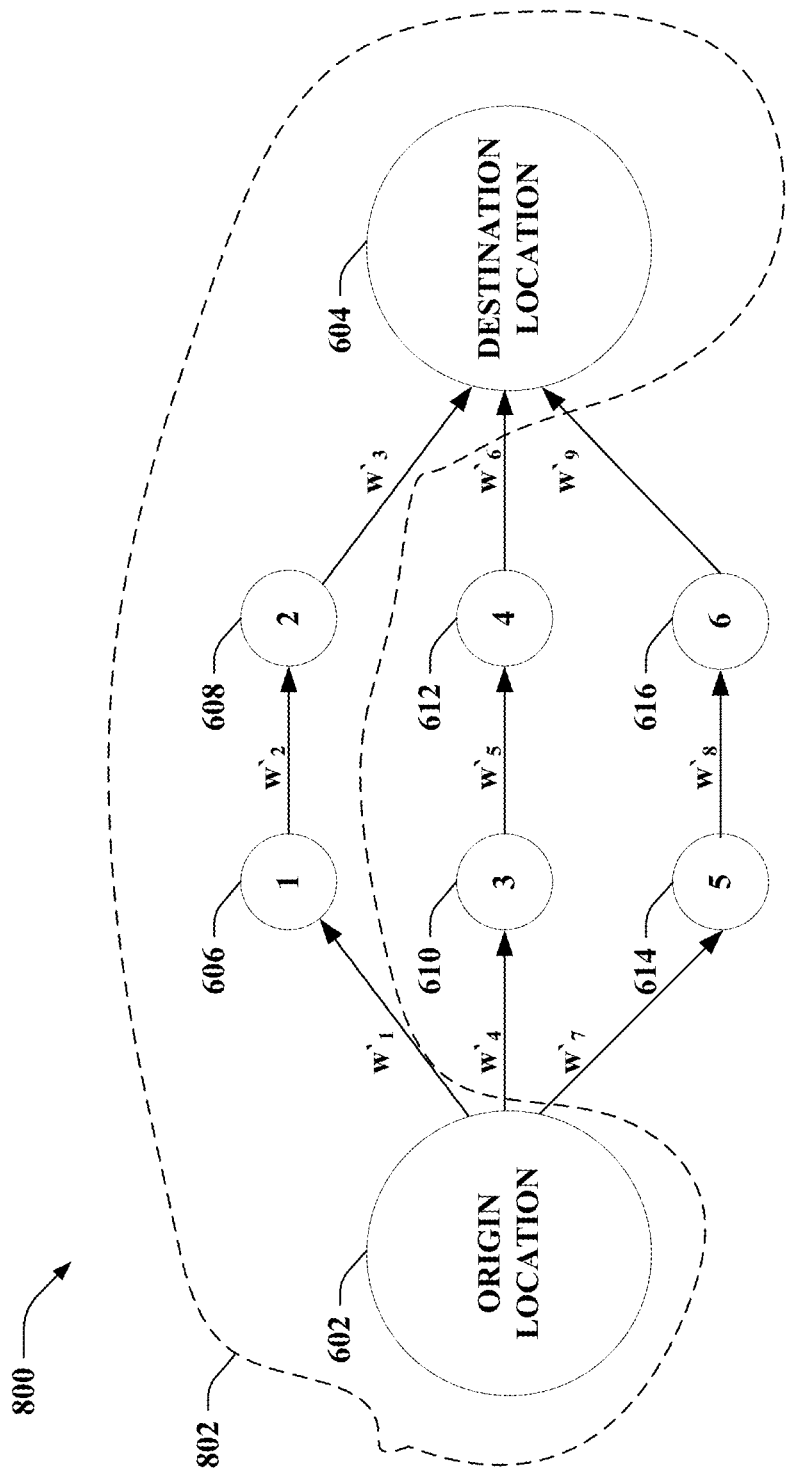
FIG. 8 illustrates a shortest path through the weighted directed graph illustrated in FIG. 7.

Referring now to FIG. 8, a shortest path 802 (illustrated via dotted lines in FIG. 8) through the weighted directed graph 700 shown in FIG. 7 is illustrated. The routing application 206 of the computing system 200 and/or the routing application 318 of the autonomous vehicle 300 may determine the shortest path 802 through the graph by applying a shortest path algorithm to the weighted directed graph 700. For instance, the shortest path algorithm may be one of a Dijkstra's algorithm, a Bellman-Ford algorithm, or a Floyd-Warshall algorithm.

As shown in FIG. 8, the shortest path 802 includes the first node 606 and the second node 608 (as well as the origin node 602 and the destination node 604). Thus, the shortest path 802 may correspond to the first candidate route 518 depicted in FIG. 5. Notably, the first candidate route 518 may not be the shortest route (from a time or a distance perspective) in the driving environment 500. Rather, the routing application 206 and/or the routing application 318 have identified the first candidate route 518 as the route to follow as the first candidate route 518 has the lowest cost to the autonomous vehicle 300 when likelihood of autonomous vehicle 300 takeover is additionally considered along with travel time or travel distance of the autonomous vehicle 300.

Figure 9:
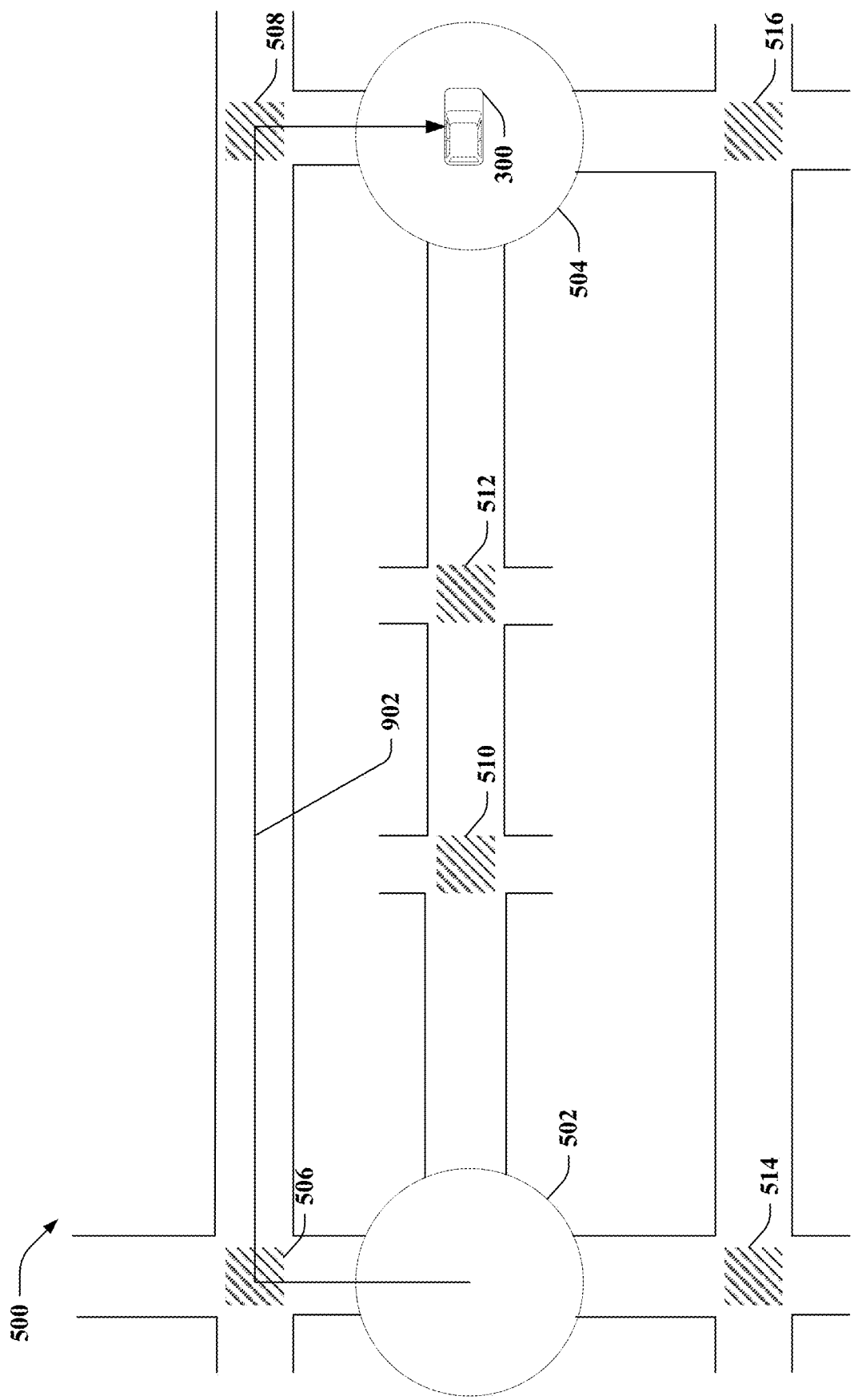
FIG. 9 illustrates an updated view of the exemplary driving environment illustrated in FIG. 5.

Turning now to FIG. 9, an updated view of the driving environment 500 depicted in FIG. 5 is illustrated. After the routing application 206 of the computing system 200 and/or the routing application 318 of the autonomous vehicle 300 determines the shortest path 802 through the weighted directed graph 700, the autonomous vehicle 300 may base its operation on the shortest path 802. More specifically, as the shortest path 802 includes the first node 606 (assigned to the first intersection 506) and the second node 608 (assigned to the second intersection 508), the autonomous vehicle 300 may control at least one of the vehicle propulsion system 306, the braking system 308, or the steering system 310 such that the autonomous vehicle 300 follows the first candidate route 518 (now referred to as "the route 902") from the origin location 502 through the first intersection 506 and the second intersection 508 in order to arrive at the destination location 504.

Accordingly, the routing application 206 executed by the processor 202 of the computing system 200 and/or the routing application 318 executed by the processor 314 of the autonomous vehicle 300 can select the route 902 (shown in FIG. 9) from the candidate routes 518-522 (shown in FIG. 5) for the autonomous vehicle 300 to follow from the origin location 502 to the destination location 504. The route 902 is selected based on risk of autonomous vehicle takeover by a human operator; such risk can be utilized to select the route 902 for the autonomous vehicle 300 whether or not a human operator is in the autonomous vehicle 300.

Moreover, pursuant to an example, it is to be appreciated that the route 902 can be selected as described above prior or responsive to a passenger beginning a trip from the origin location 502 to the destination location 504. In accordance with another example, the route 902 can be selected while a passenger is on a trip (e.g., a route can be updated such that the origin location 502 can be a current location of the autonomous vehicle 300 during the trip).

Figure 10:
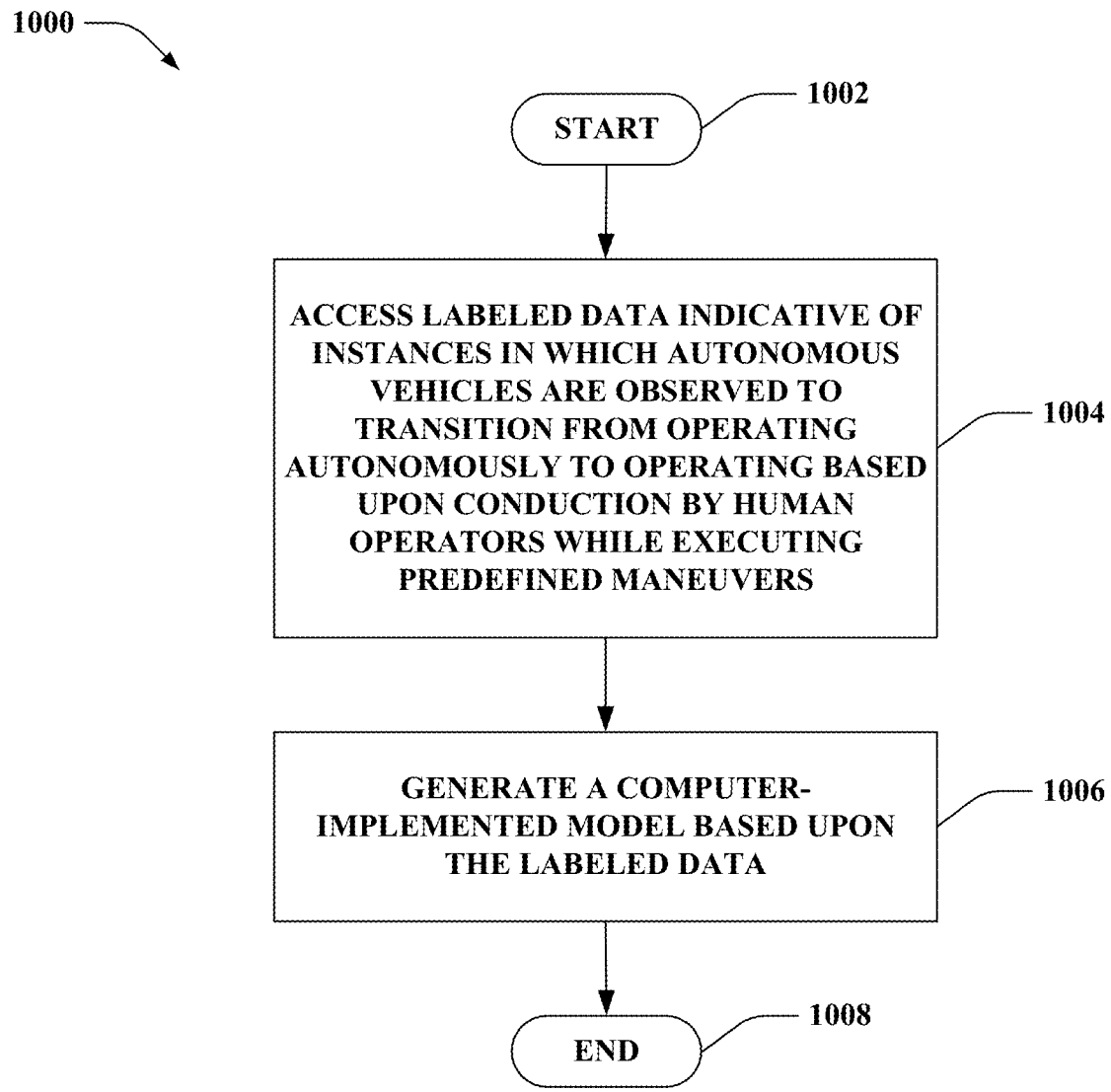
FIG. 10 is a flow diagram that illustrates an exemplary methodology performed by a computing system for generating a computer-implemented model that outputs a score indicative of autonomous vehicle takeover by a human operator.
Figure 11:
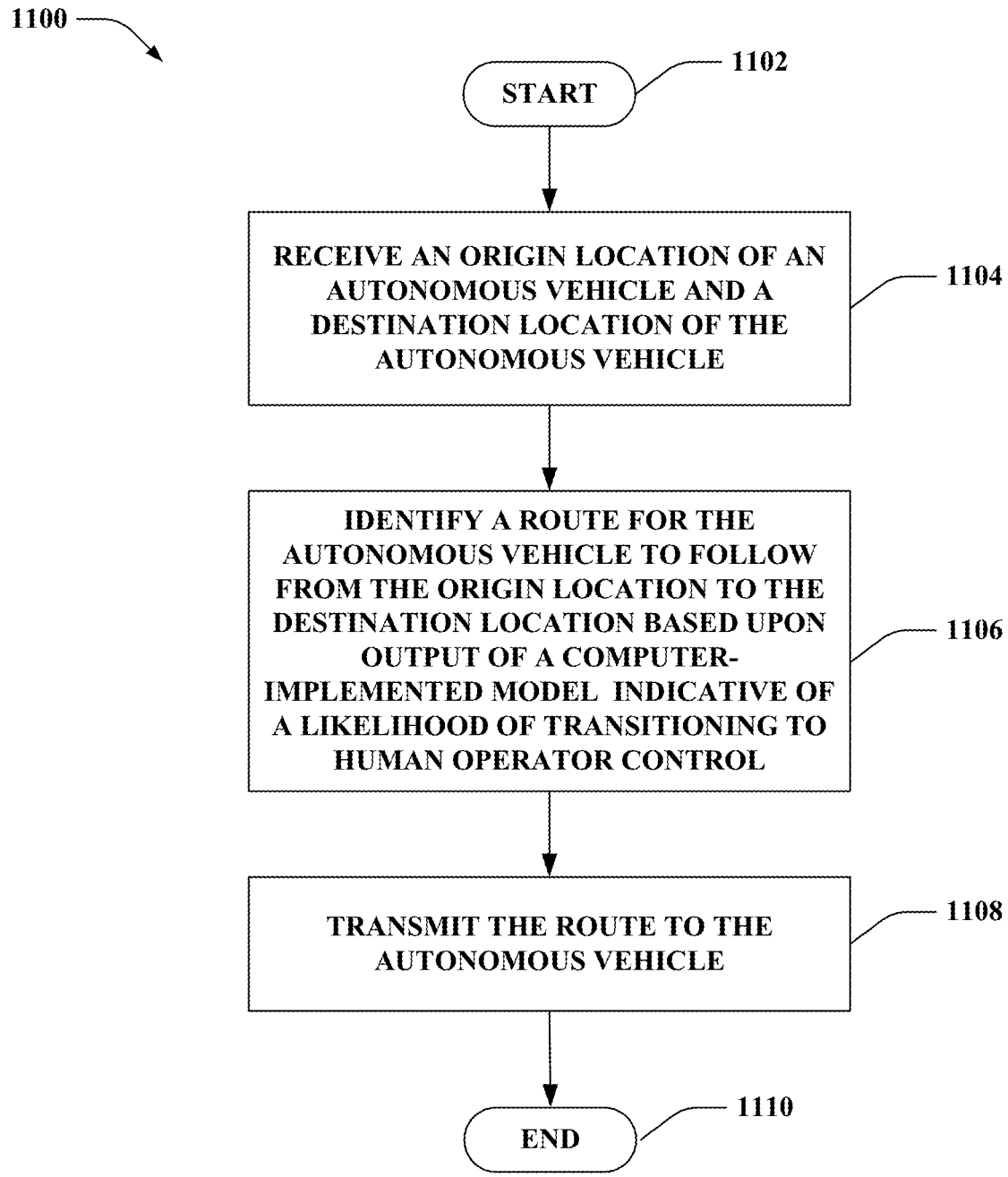
FIG. 11 is a flow diagram that illustrates an exemplary methodology performed by a computing system for identifying a route for an autonomous vehicle to follow from an origin location to a destination location.
Figure 12:
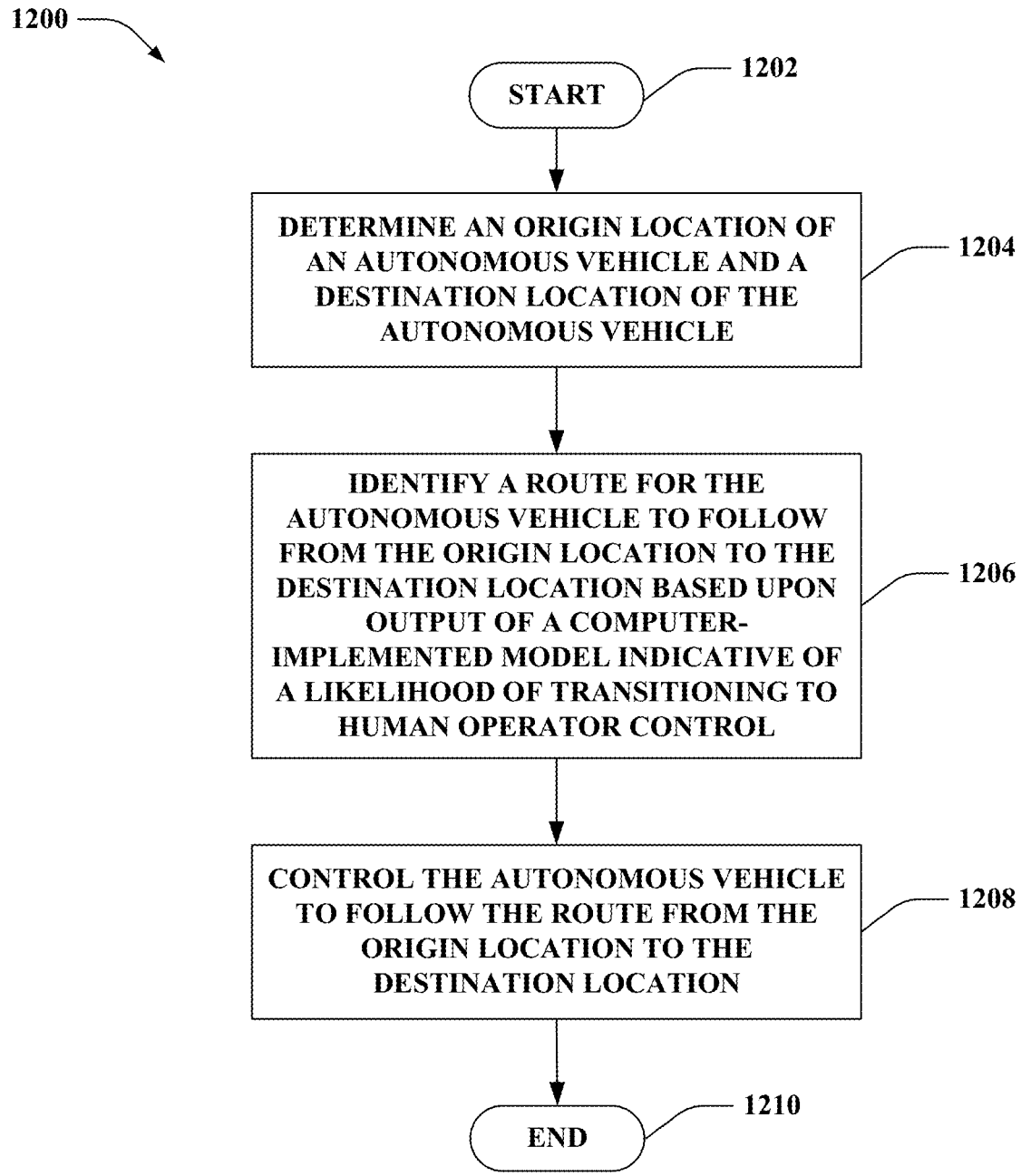
FIG. 12 is a flow diagram that illustrates an exemplary methodology performed by an autonomous vehicle for identifying and following a route from an origin location to a destination location.

FIGS. 10-12 illustrate exemplary methodologies relating to routing an autonomous vehicle based upon risk of autonomous vehicle takeover by a human operator. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 10, a methodology 1000 performed by a computing system for generating a computer-implemented model that outputs a score indicative of a likelihood of autonomous vehicle takeover by a human operator is illustrated. The methodology 1000 begins at 1002, and at 1004, the computing system accesses labeled data from a data store. The labeled data is indicative of instances in which autonomous vehicles are observed to transition from operating autonomously to operating based upon conduction by human operators while the autonomous vehicles are executing predefined maneuvers.

At 1006, the computing system generates a computer-implemented model based upon the labeled data. The computer-implemented model takes an indication of a maneuver in the predefined maneuvers as input. The computer-implemented model outputs a score that is indicative of a likelihood that an autonomous vehicle will be caused to transition from operating autonomously to operating based upon conduction by a human operator due to the autonomous vehicle executing the maneuver. The methodology 1000 concludes at 1008.

Turning to FIG. 11, a methodology 1100 performed by a computing system for identifying a route for an autonomous vehicle to follow is illustrated. The methodology 1100 begins at 1102, and at 1104, the computing system receives an origin location of an autonomous vehicle and a destination location of the autonomous vehicle. For instance, the origin location can be based on a current location of the autonomous vehicle or can be a pickup location for a passenger of the autonomous vehicle. Moreover, the computing system can receive the origin location and the destination location from a computing device operated by a passenger (or future passenger); however, it is further to be appreciated that the computing system can additionally or alternatively receive the origin location and/or the destination from a differing source other than a computing device operated by a passenger (or future passenger).

At 1106, the computing system identifies a route for the autonomous vehicle to follow from the origin location to the destination location based upon output of a computer-implemented model. The computing system identifies the route from amongst a plurality of candidate routes. The computer-implemented model is generated based upon labeled data that is indicative of instances in which autonomous vehicles are observed to transition from operating autonomously to operating based upon conduction by human operators while the autonomous vehicles are executing predefined maneuvers. The computer-implemented model takes, as input, an indication of a maneuver in the predefined maneuvers that is performed by the autonomous vehicle when the autonomous vehicle follows a candidate route in the candidate routes. The computer-implemented model outputs a score that is indicative of a likelihood that the autonomous vehicle will be caused to transition from operating autonomously to operating based upon conduction by a human operator due to the autonomous vehicle executing the maneuver along the candidate route. The computing system identifies the route based in part upon the score.

At 1108, the computing system transmits the route to the autonomous vehicle. The autonomous vehicle can follow the route from the origin location to the destination location. The methodology 1100 concludes at 1110.

With reference to FIG. 12, a methodology 1200 performed by an autonomous vehicle for identifying and following a route is illustrated. The methodology 1200 begins at 1202, and at 1204, the autonomous vehicle determines an origin location of the autonomous vehicle and a destination location of the autonomous vehicle. For instance, the origin location can be a current location of the autonomous vehicle or can be a pickup location for a passenger of the autonomous vehicle. According to an illustration, the origin location and the destination location can be determined based on input received from a computing device operated by a passenger (or future passenger).

At 1206, the autonomous vehicle identifies a route for the autonomous vehicle to follow from the origin location to the destination location based upon output of a computer-implemented model. The autonomous vehicle identifies the route from amongst a plurality of candidate routes. The computer-implemented model is generated based upon labeled data that is indicative of instances in which autonomous vehicles are observed to transition from operating autonomously to operating based upon conduction by human operators.

At 1208, the autonomous vehicle controls at least one of a vehicle propulsion system, a braking system, or a steering system of the autonomous vehicle such that the autonomous vehicle follows the route from the origin location to the destination location. The methodology 1200 concludes at 1210.

Figure 13:
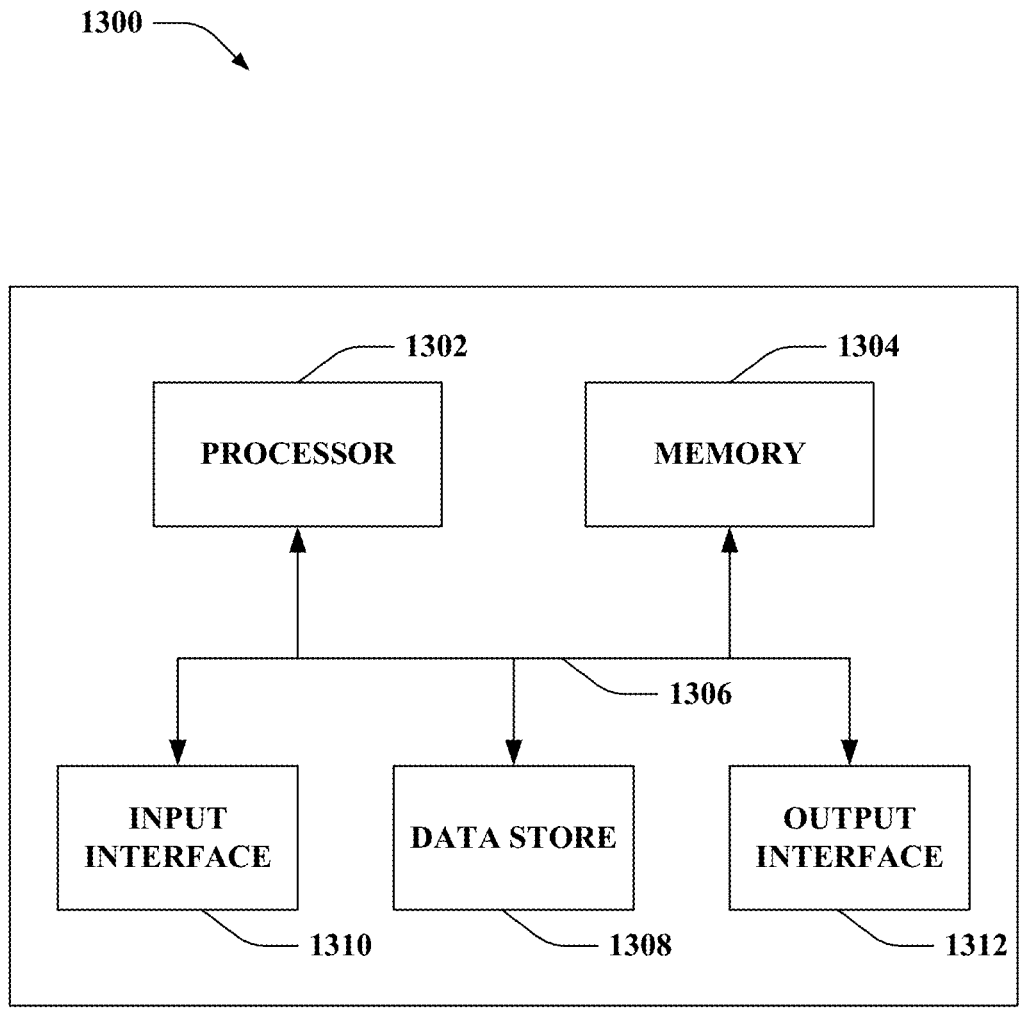
FIG. 13 illustrates an exemplary computing device.

Referring now to FIG. 13, a high-level illustration of an exemplary computing device 1300 that can be used in accordance with the systems and methodologies disclosed herein is illustrated. For instance, the computing device 1300 may be or include the computing system 100, the computing system 200, or the computing system 312. The computing device 1300 includes at least one processor 1302 that executes instructions that are stored in a memory 1304. The instructions may be, for instance, instructions for implementing functionality described as being carried out by one or more systems discussed above or instructions for implementing one or more of the methods described above. The processor 1302 may be a graphics processing unit (GPU), a plurality of GPUs, a central processing unit (CPU), a plurality of CPUs, a multi-core processor, etc. The processor 1302 may access the memory 1304 by way of a system bus 1306. In addition to storing executable instructions, the memory 1304 may also store computer-implemented models, labeled data, map data, weighted directed graphs, etc.

The computing device 1300 additionally includes a data store 1308 that is accessible by the processor 1302 by way of the system bus 1306. The data store 1308 may include executable instructions, computer-implemented models, labeled data, map data, weighted directed graphs, etc. The computing device 1300 also includes an input interface 1310 that allows external devices to communicate with the computing device 1300. For instance, the input interface 1310 may be used to receive instructions from an external computer device, etc. The computing device 1300 also includes an output interface 1312 that interfaces the computing device 1300 with one or more external devices. For example, the computing device 1300 may transmit control signals to the vehicle propulsion system 306, the braking system 308, and/or the steering system 310 by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, cellular, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a processor; and
   memory that stores computer-executable instructions that, when executed by the processor, cause the processor to perform acts comprising:
      receiving an indication specifying an origin location for a trip in the autonomous vehicle and a destination location for the trip in the autonomous vehicle;
      identifying a route for the autonomous vehicle to follow from the origin location to the destination location, the route being identified based on a likelihood that the autonomous vehicle will be caused to transition from operating autonomously to operating based upon conduction by a human operator, the likelihood that the autonomous vehicle will be caused to transition from operating autonomously to operating based upon conduction by the human operator being based on the autonomous vehicle executing a particular maneuver at a particular intersection along the route, the particular maneuver being from a set of predefined maneuvers; and
      controlling the autonomous vehicle to follow the route from the origin location to the destination location.

2. The autonomous vehicle of claim 1, wherein the set of predefined maneuvers comprises:
   remaining in a lane on a road;
   a left lane change;
   a right lane change;
   a left turn;
   a right turn; and
   remaining stationary.

3. The autonomous vehicle of claim 1, wherein the likelihood that the autonomous vehicle will be caused to transition from operating autonomously to operating based upon conduction by the human operator is further based on a weather condition at the particular intersection in which the autonomous vehicle is to execute the particular maneuver.

4. The autonomous vehicle of claim 1, wherein the likelihood that the autonomous vehicle will be caused to transition from operating autonomously to operating based upon conduction by the human operator is further based on a time of day at which the autonomous vehicle is to execute the particular maneuver at the particular intersection.

5. The autonomous vehicle of claim 1, wherein the likelihood that the autonomous vehicle will be caused to transition from operating autonomously to operating based upon conduction by the human operator is further based on a type of traffic control device at the particular intersection.

6. The autonomous vehicle of claim 1, wherein the likelihood that the autonomous vehicle will be caused to transition from operating autonomously to operating based upon conduction by the human operator is a score outputted by a computer-implemented model, the computer-implemented model being generated based upon labeled data that is indicative of instances in which autonomous vehicles are observed to transition from operating autonomously to operating based upon conduction by human operators while the autonomous vehicles are executing the predefined maneuvers.

7. The autonomous vehicle of claim 6, wherein the computer-implemented model takes, as input, an indication of the particular maneuver that is to be performed by the autonomous vehicle at the particular intersection along the route.

8. The autonomous vehicle of claim 1, wherein the likelihood that the autonomous vehicle will be caused to transition from operating autonomously to operating based upon conduction by the human operator is further identified based on a heat map that specifies likelihoods of autonomous vehicle takeovers at intersections.

9. The autonomous vehicle of claim 1, wherein the route is further identified based on travel time from the origin location to the destination location.

10. The autonomous vehicle of claim 1, wherein the route is identified from amongst a plurality of candidate routes.

11. The autonomous vehicle of claim 1, the acts further comprising:
   generating data regarding an instance of the autonomous vehicle transitioning from operating autonomously to operating based upon conduction by the human operator; and
   sending the data from the autonomous vehicle to a remote computing system.

12. A method of controlling an autonomous vehicle, comprising:
   receiving an indication specifying an origin location for a trip in the autonomous vehicle and a destination location for the trip in the autonomous vehicle;
   identifying a route for the autonomous vehicle to follow from the origin location to the destination location, the route being identified based on a likelihood that the autonomous vehicle will be caused to transition from operating autonomously to operating based upon conduction by a human operator, the likelihood that the autonomous vehicle will be caused to transition from operating autonomously to operating based upon conduction by the human operator being based on the autonomous vehicle executing a particular maneuver at a particular intersection along the route, the particular maneuver being from a set of predefined maneuvers; and causing the autonomous vehicle to follow the route from the origin location to the destination location.

13. The method of claim 12, wherein the likelihood that the autonomous vehicle will be caused to transition from operating autonomously to operating based upon conduction by the human operator is further based on a weather condition at the particular intersection in which the autonomous vehicle is to execute the particular maneuver.

14. The method of claim 12, wherein the likelihood that the autonomous vehicle will be caused to transition from operating autonomously to operating based upon conduction by the human operator is further based on a time of day at which the autonomous vehicle is to execute the particular maneuver at the particular intersection.

15. The method of claim 12, wherein the likelihood that the autonomous vehicle will be caused to transition from operating autonomously to operating based upon conduction by the human operator is further based on a type of traffic control device at the particular intersection.

16. The method of claim 12, wherein the likelihood that the autonomous vehicle will be caused to transition from operating autonomously to operating based upon conduction by the human operator is a score outputted by a computer-implemented model, the computer-implemented model being generated based upon labeled data that is indicative of instances in which autonomous vehicles are observed to transition from operating autonomously to operating based upon conduction by human operators while the autonomous vehicles are executing the predefined maneuvers.

17. The method of claim 12, wherein the likelihood that the autonomous vehicle will be caused to transition from operating autonomously to operating based upon conduction by the human operator is further identified based on a heat map that specifies likelihoods of autonomous vehicle takeovers at intersections.

18. A computing system, comprising:
a processor; and
memory that stores computer-executable instructions that, when executed by the processor, cause the processor to perform acts comprising:
receiving an indication specifying an origin location for a trip in an autonomous vehicle and a destination location for the trip in the autonomous vehicle;
identifying a route for the autonomous vehicle to follow from the origin location to the destination location, the route being identified based on a likelihood that the autonomous vehicle will be caused to transition from operating autonomously to operating based upon conduction by a human operator, the likelihood that the autonomous vehicle will be caused to transition from operating autonomously to operating based upon conduction by the human operator being based on the autonomous vehicle executing a particular maneuver at a particular intersection along the route, the particular maneuver being from a set of predefined maneuvers; and
causing the autonomous vehicle to follow the route from the origin location to the destination location.

19. The computing system of claim 18, wherein the computing system is comprised by the autonomous vehicle.

20. The computing system of claim 18, wherein the computing system is separate from the autonomous vehicle such that the computing system and the autonomous vehicle communicate via a network.

* * * * *